Sept. 29, 1959
W. F. BUCHELE
2,906,270
METHOD OF THRESHING GRAIN
Filed Jan. 23, 1956
2 Sheets-Sheet 1
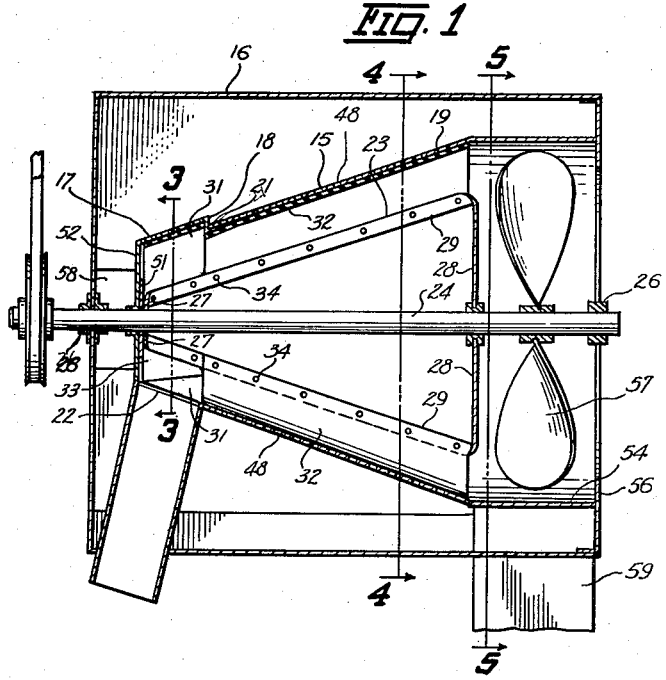
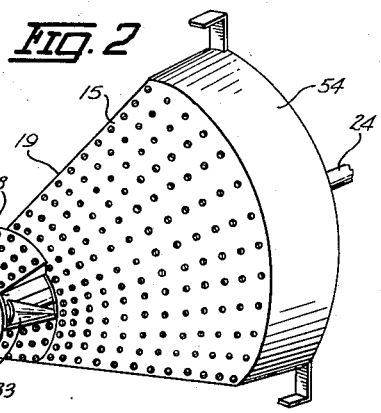
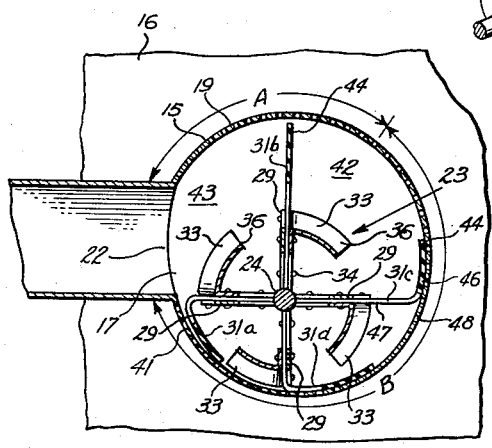
INVENTOR.
WESLEY F. BUCHELE
BY
ATTORNEY.

Sept. 29, 1959  W. F. BUCHELE  2,906,270
METHOD OF THRESHING GRAIN
Filed Jan. 23, 1956  2 Sheets-Sheet 2
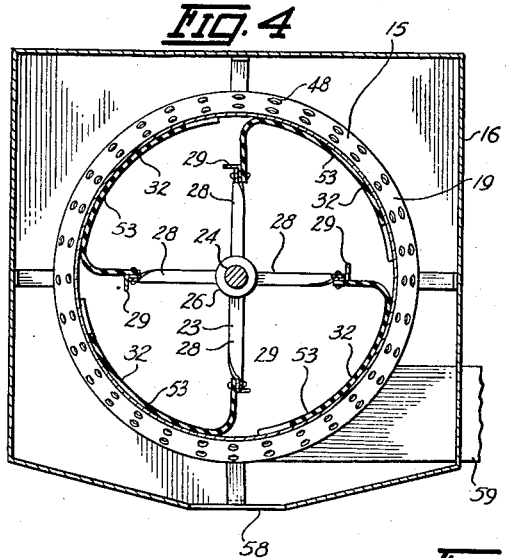
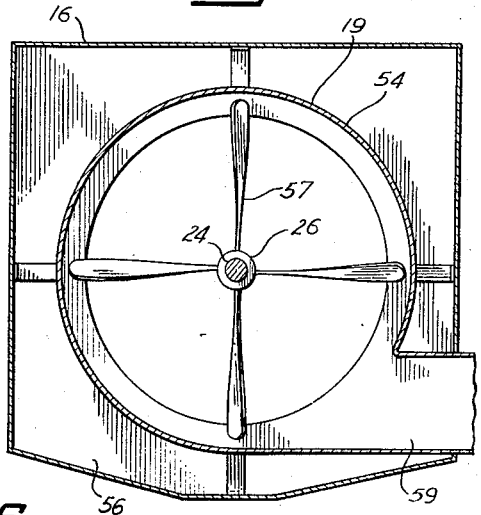
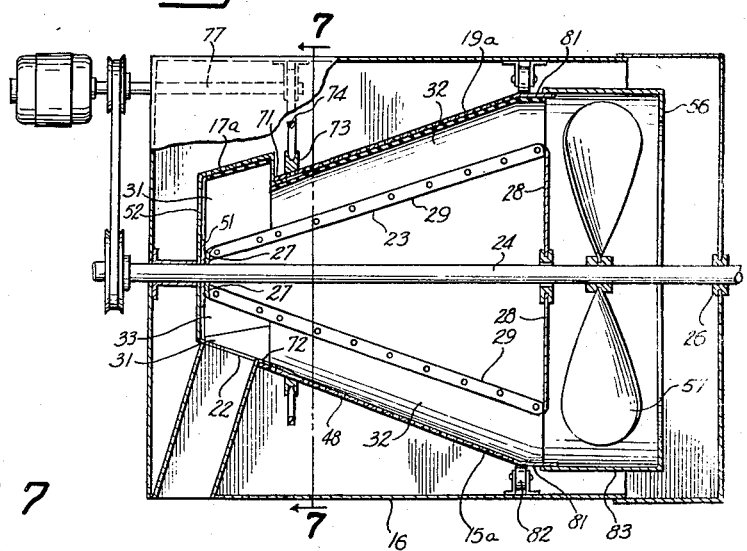
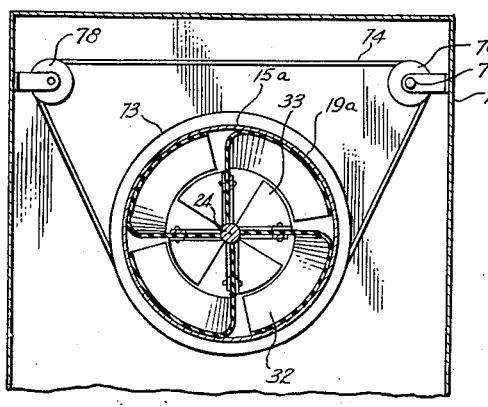
INVENTOR.
WESLEY F. BUCHELE
BY
ATTORNEY.

United States Patent Office 2,906,270
Patented Sept. 29, 1959

2,906,270

METHOD OF THRESHING GRAIN

Wesley F. Buchele, Ames, Iowa

Application January 23, 1956, Serial No. 560,552

1 Claim. (Cl. 130—27)

This invention relates generally to grain threshing apparatus and in particular to an improved method of and apparatus for threshing grain wherein an impeller is rotatable within a concave or tubular screen.

An object of this invention is to provide an improved method and apparatus for threshing grain.

A further object of this invention is to provide a grain threshing apparatus wherein rotatable flexible threshing or impeller members are progressively flexed during rotation within and against the inner peripheral surface of a screen to concurrently effect a threshing of the grain and a separation of the grain from the straw.

Another object of this invention is to provide threshing apparatus wherein material to be threshed is continuously drawn into one end of a cone shaped screen for travel along a generally spiral path toward the opposite end of the screen, with the material being continuously threshed during such travel.

Still another object of this invention is to provide a threshing apparatus wherein the grain is threshed by a rubbing or rolling action so as to substantially eliminate any cracking or breaking of the grain being threshed.

A further object of this invention is to provide a threshing apparatus which is of a compact and simple construction and capable of handling various materials with a high degree of threshing efficiency.

Still another object of this invention is to provide a threshing apparatus of impeller type wherein the material to be threshed is drawn into the apparatus, threshed and separated by the action of the impeller.

Further objects, features and advantages of this invention will become apparent from the following description when taken in connection with the accompanying drawing in which:

Fig. 1 is a horizontal longitudinal sectional view of the threshing apparatus of this invention;

Fig. 2 is a perspective view of the screen for the threshing apparatus shown in Fig. 1;

Figs. 3, 4 and 5 are sectional views as seen along the lines 3—3, 4—4, and 5—5 respectively, in Fig. 1;

Fig. 6 is a sectional view of a modified form of the threshing apparatus of this invention, illustrated substantially similarly to Fig. 1, and wherein the screen is rotatable relative to the impeller; and Fig. 7 is a sectional view taken along the line 7—7 in Fig. 6.

With reference to the drawing the threshing apparatus of this invention is illustrated in Fig. 1 as including a perforated screen 15 of a generally hollow cone shape supported in a fixed position within a housing unit 16. As best appears in Figs. 2 and 3, the small or inlet end portion 17 of the screen 15 is of a generally involute shape in transverse cross section, and the larger portion 19 of the screen 15 is circular in transverse cross section (Fig. 5). The inlet portion 17 of the screen 15 is contoured or shaped at its junction 18 with the adjacent end 21 of the larger section 19 to provide a single continuous screen 15.

As illustrated in Figs. 2 and 3 the screen 15 is formed with an inlet opening 22, for the material to be threshed, so that such material is introduced into the screen 15 in a direction normal to the surface of the screen 15.

Rotatable within the screen 15 is an impeller unit 23 (Figs. 1 and 3) which includes a shaft 24 rotatably supported in bearings 26 carried on the housing 16. Secured to and extended radially from the shaft 24, and arranged within the cone section 17 are supporting arms 27 illustrated as being four in number and spaced apart a distance of about ninety degrees. Corresponding, but longer supporting arms 28 are secured to the shaft 24 at the large end of the screen 15 (Fig. 1). Cross bars 29 connected between the free ends of corresponding arms 27 and 28 travel in a plane substantially parallel with the surface of the screen 15. Each cross arm 29 supports a pair of impeller members 31 and 32, with the impeller members 31 being located within the screen section 17, and the impeller members 32 within the screen section 19.

As best appears in Fig. 3, the impeller members 31 are secured to a corresponding cross bar 29 by means of a combination clamping and straw breaking member 33 which is of a substantially angle shape in transverse cross section. The impeller members 31 and 32 are positioned between a cross bar 29 and a straw breaker 33 and secured thereto by clamping bolts 34. It will be noted that the laterally extended legs 36 of the straw breakers extend forwardly from a corresponding cross bar 29 relative to the direction of rotation of the impeller unit 23, with this rotation being in a clockwise direction as viewed in Fig. 3. Also, a straw breaker or clamping member 33 within the intake section 17 of the screen 15 is tapered inwardly in a direction toward the large end portion 19 of the screen 15, for a purpose to appear later.

In the operation of the threshing apparatus shown in Fig. 1, the material to be threshed is introduced into a chute, conveyor or the like (not shown), arranged opposite the screen inlet opening 22 and extended in a direction normal to the surface of the screen 15. This material is drawn into the screen section 17 by a suction pressure created at the inlet opening 22.

This suction pressure at the inlet opening 22 is achieved by the shape of the screen portion 17 and the action thereon of the impeller 31. The periphery of the screen portion 17, in a clockwise direction from the inlet 22, as viewed in Fig. 3, is generated about the impeller shaft 24 with progressively increasing radii over a peripheral distance indicated at A, and with progressively decreasing radii over the peripheral distance indicated at B and which terminates at the opening 22. Over the distance A the radii of the screen portion 17 are slightly greater than the radial length of an impeller member 31, with the radii over the distance B being progressively shorter than the radial length of an impeller member 31.

On rotation of an impeller member 31 in a clockwise direction as viewed in Fig. 3, a member 31 has its greatest contact with the screen portion 17 at a section 41 thereof immediately prior to travel across the opening 22. As a result, when a member 31 is released from the section 41, it creates a suction or low pressure area 42 in the screen portion 17 opposite the opening 22.

In other words, the low pressure area 42 is caused by a flexible rubber impeller member 31 being released from the screen section 41, which functions like a cam, and then being permitted to move toward a radially extended position under the action of centrifugal force. As a result the volume of air confined in the area 42 between the impeller members, designated as 31b and 31c in Fig. 3, and positioned forwardly in the direction of rotation from the screen section 41 is much greater than the volume of air confined in the space or area 43 between the impeller member 31a and the impeller member 31b positioned rearwardly of the screen section 41. Air thus rushes in from the inlet 22 to fill the expanded space 43, drawing with it the material to be threshed, and the impeller member 31a picks up such material and initiates the threshing action thereon by impact and rotation.

The material leaving the intake 22 is thus under the action of centrifugal force, directed radially outwardly from the shaft 24 and is concurrently accelerated about the shaft 24. It is seen, therefore, that the material to be threshed is thrown against the inner peripheral surface of the screen 17, at the portion A thereof, and deflected by the screen in the direction of rotation of the impellers 31 due to the increasing radii of the screen 17 over the portion A. The impeller members 31, on rotation of the impeller 23, have their terminal ends 44 strike the screen for the first time as they pass into the screen portion B. A small amount of material may pass the outer end 44 of an impeller member 31, as it travels across the screen portion A. However, a following member 31 works against the bypassed material and forms an air lock for the preceding impeller member.

As a result of the impact of the terminal ends 44 of the members 31 against the screen 17 the outer portions 46 of the impeller members 31 collapse, namely, are bent back against the screen so as to be in a trailing relation with the inner portions 47 of the impeller members, which remain radially extended under the action of centrifugal force. The outer or trailing portion 46 of an impeller member 31 progressively increases in length as the impeller member moves across the screen portion B.

These trailing portions 46 rub or roll the material to be threshed against the screen 17, with the rubbing action being effected by the centrifugal force of rotation of the impeller members 31 and the deceleration or moving inwardly of the screen surface toward the center of rotation of the material and the impeller members 31. This rubbing action is very similar to that which takes place when a head of a grain is rubbed or rolled between the palms of the hands. Since there is appreciable slippage between the material and the trailing portions 46 of the impeller members 31, the material rolls along the screen in a manner similar to the action of the balls in a ball bearing. As a result of this slippage there is an increased rubbing and threshing action due to the reduced velocity or rate of travel of the material which permits several impeller members 31 to act on the material, which is thus passed from one impeller member to successive trailing impeller members during its travel around the screen.

As the grain is threshed from a head, it is free to travel radially outwardly from the straw to the screen and thence through the perforations 48 in the screen. It is seen, therefore, that the threshed grain or seed is moved through the screen 17 by the action of centrifugal force directly on the grain, the centrifugal force of an impeller member 31 acting on the grain and the pumping or fan action of the impeller members 31 tending to blow the grain through the screen 17.

The long straw is acted upon by the straw breakers 33 with the tapered construction of the straw breakers 33 tending to deflect or throw the straw toward the large end of the screen 15. Also, wrapping of straw about the shaft 24 at the small end of the screen 15 is eliminated by the provision of a disc 51 mounted on the shaft 24 within the screen 15 and adjacent to its closed small end 52.

The material thus introduced into the screen 15, and initially acted upon by the impeller members 31 follows the inner peripheral surface of the screen portion 17 in a spiral path movement into the screen portion 19 where it is acted upon by the impeller members 32, which are of a generally triangular shape so as to be of a longer length radially at the large end of the screen 15, relative to their radial length at the junction 18 of the screen portions 17 and 19. As a result, the trailing portions 53 (Fig. 4) of the impeller members 32 when flexed against the inner peripheral surface of the screen portion 19 by the action of centrifugal force, extend substantially between adjacent cross bars 28 to provide for a maximum rubbing and rolling action upon the material to be threshed.

The threshed grain or seed is moved outwardly from the screen 15 through the perforations 48 in the manner previously described.

The screen 15, at its large end, terminates in a straight imperforate cylindrical section 54, which in turn has an inwardly extended terminal flange or collar 56. Mounted upon the shaft 24, and within the cylindrical section 54 is a blower or fan 57 which serves a dual function.

By virtue of the fan action of the impeller members 32 there is a tendency to effect a suction action on the threshed grain preventing a free flow of such grain through the perforations 48 in the screen 15. The blower 57 forces air inwardly of the screen 15 in amounts sufficient to overcome this fan action of the impeller members 32. The threshed grain is thus free to travel through the screen 15, into the housing 16 for downward travel to an outlet opening 58 (Fig. 4) which communicates with a receiving bin or the like (not shown).

The blower 57 also functions as an impeller for discharging straw which moves outwardly from the large end of the screen 15, into a discharge outlet 59 (Fig. 5) extended tangentially from the cylindrical section 54, with this discharge taking place as a result of a direct impact of the straw with the blower 57 and the blowing action of the blower 57.

The threshing apparatus shown in Figs. 6 and 7 is substantially similar to that shown in Fig. 1–5, inclusive. Accordingly, like structure in the apparatus shown in Figs. 6 and 7 is designated by like numerals.

The screen 15a for the apparatus shown in Figs. 6 and 7 has an intake section 17a of a contour and shape similar in all respects to the intake section 17 of the screen 15 of Fig. 5. The screen section 19a is of a circular shape in transverse cross section and has the inner or smaller end 71 thereof separate from and arranged in an overlapping relation with the outer or larger end 72 of the screen section 17. In the apparatus shown in Figs. 6 and 7, the screen section 19a is rotated relative to the screen section 17a which is stationary.

As shown in Fig. 7 the smaller end 71 of the screen section 19a is provided with an annular V-belt track 73 for receiving a V-belt 74 which travels from the track 73 about a pulley 76 mounted on a drive shaft 77 which drives both the screen section 19a and the shaft 24. The belt 74 is also trained about an idler pulley 78, with the pulleys 76 and 78 being arranged to opposite sides of and above the screen section 19a. The belt 74 thus supports the inner end 71 of the screen section 19a for rotation.

The outer or large end of the screen section 19a terminates in an axially extended annular flange 81 which is arranged in riding engagement with a series of rollers 82 mounted on the housing 16. A blower 57 is carried within a stationary cylindrical member 83 arranged in an overlapping relation with the screen bearing section 81. In the operation of the threshing apparatus shown in Figs. 6 and 7, the screen section 19a is rotated at a somewhat slower speed than the impeller unit 23. By virtue of this relative rotation between the screen section 19a and the impeller unit 23, the impeller unit can be operated at a higher speed relative to its operation in the apparatus shown in Fig. 1, with reduced wear of the impeller members 32 and the edges of the perforations 48 in the screen portion 19a. It will be apparent that the higher the speed of rotation of the impeller unit 23, the better is the threshing action.

From the above description it is seen that this invention provides a method and apparatus for threshing grain in which material to be threshed follows a generally spiral path to provide for a continuous threshing operation of greater duration relative to a straight threshing cylinder or screen of the same length as the cone shape screen 15.

Although the invention has been described with respect to a preferred embodiment thereof, it is to be understood that it is not to be so limited, since changes can be made therein which are within the scope of the appended claim.

I claim:

The method of threshing a material which comprises the steps: introducing the material to be threshed into the small end of a spiral path; breaking said material into small lengths at said small end; moving the material toward the larger end of the path; subjecting the material to a rubbing action in said spiral path of movement; and ejecting the grain from the path before said grain reaches the larger end of the path.

References Cited in the file of this patent

UNITED STATES PATENTS

| | | |
|---|---|---|
| 154,924 | Stevens | Sept. 8, 1874 |
| 483,899 | Cantwell | Oct. 4, 1892 |
| 739,908 | Nightgale | Sept. 29, 1903 |
| 1,118,673 | Northrop | Nov. 24, 1914 |
| 1,808,785 | Paradise et al. | June 9, 1931 |
| 2,108,655 | Dempsey | Feb. 15, 1938 |
| 2,383,911 | Dray | Aug. 28, 1945 |
| 2,630,123 | Womack | Mar. 3, 1953 |